Figure 1:
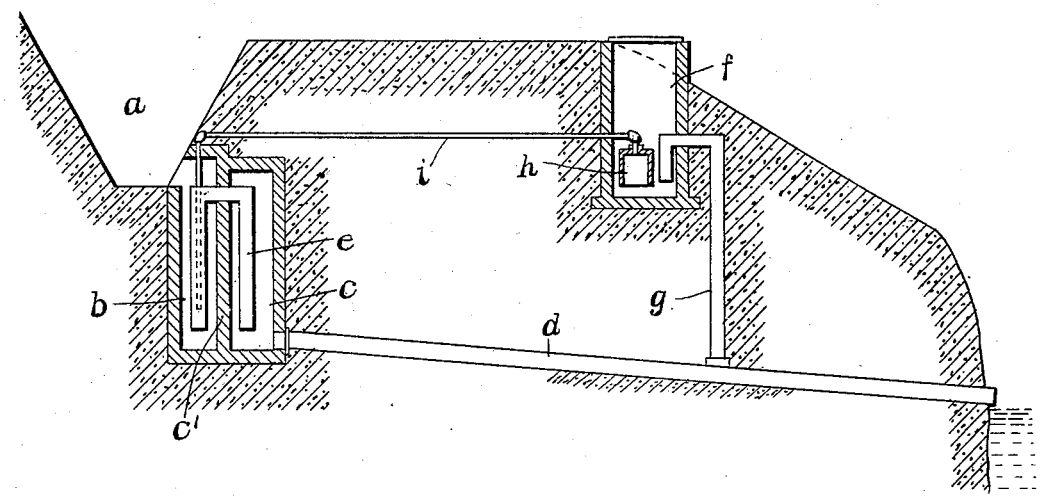

No. 863,641. PATENTED AUG. 20, 1907.
A. PRIESTMAN.
APPARATUS FOR AUTOMATICALLY CONTROLLING THE FLOW OF LIQUIDS.
APPLICATION FILED AUG. 10, 1903.

WITNESSES:
D. Webster, Jr.
M. J. Eyre

INVENTOR
Albert Priestman
BY
Attorney

UNITED STATES PATENT OFFICE.

ALBERT PRIESTMAN, OF PHILADELPHIA, PENNSYLVANIA.

APPARATUS FOR AUTOMATICALLY CONTROLLING THE FLOW OF LIQUIDS.

No. 863,641.      Specification of Letters Patent.      Patented Aug. 20, 1907.

Application filed August 10, 1903. Serial No. 168,920.

*To all whom it may concern:*

Be it known that I, ALBERT PRIESTMAN, of the city and county of Philadelphia, State of Pennsylvania, have invented an Improvement in Apparatus for Automatically Controlling the Flow of Liquids, of which the following is a specification.

It is the object of this invention to automatically control the flow of liquids through a conduit or pipe by devices controlled by the level of an independent body of liquid.

The flow of the liquid may be controlled in either direction, whether it be from a source or reservoir to a main or tank, or vice versa.

In one application of the invention illustrated in the drawings, it is applied to a drainage system for discharging waste water or sewage into a river or main, and is so arranged that the rise of the level of the river or main above a certain point,—which would ordinarily result in back flow and the flooding of the drain—will automatically seal the conduit and prevent such back flow.

The same apparatus may be used when the normal flow is in the other direction, as from a source or river to irrigating canals or ditches, or from a variable source to storage tanks, to automatically stop the flow when the level in the source reaches a certain level.

In carrying out this part of the invention, the conduit is connected by an air pipe with a pressure bell subjected to the controlling body of liquid, so that when the same reaches a certain level, air will be compressed in the bell and forced through the air pipe into the conduit to form an air seal therein.

My invention also embraces the combination with such means for controlling the flow, of devices to automatically unseal the conduit to reëstablish the flow independently of the level of the liquid in the source.

Figure 2:
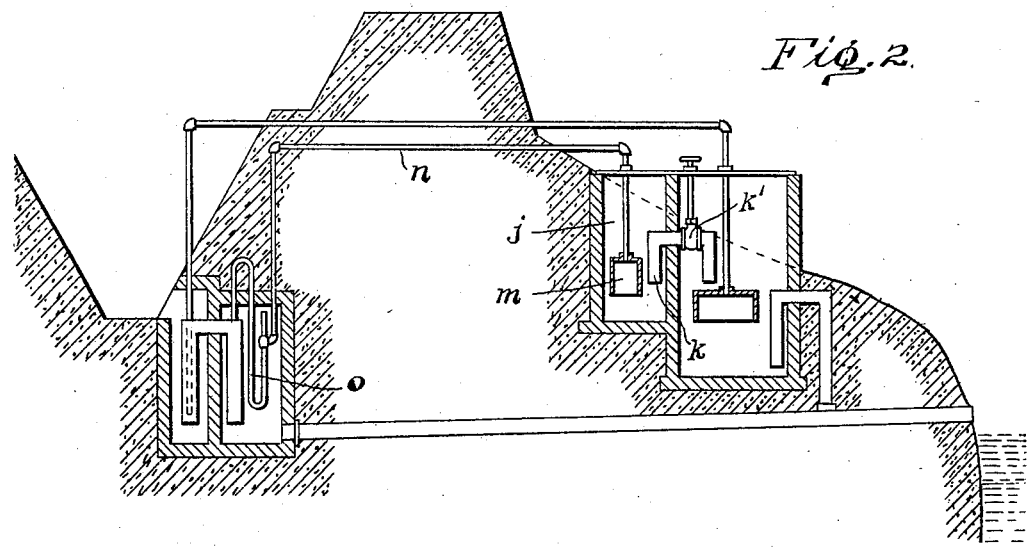

In the drawings: Figure 1 is a transverse vertical section of a land dike and drain to which my devices for controlling the flow of the water are applied; and Fig. 2 is a similar view with the addition of the automatic relief devices for reëstablishing the flow under certain conditions.

$a$ is a ditch or conduit, which communicates with a chamber $b$ constructed of iron, masonry or other water holding material. $c$ is a second chamber adjacent to the chamber $b$ which communicates with the pipe or conduit $d$ leading to the river or the like.

$e$ is an inverted U shaped pipe having one open leg in the chamber $b$ and the other in the chamber $c$ with the horizontal portion extending through the partition $c'$. When not otherwise obstructed water may flow from one chamber to the other through this pipe $e$.

$f$ is a suitably located chamber communicating with the river or reservoir, by the level of which the flow through the pipe $e$ is to be controlled. As shown it is connected with the main $d$ by a siphon pipe $g$.

$h$ is an inverted bell in the chamber $f$ having an air pipe $i$ leading to the pipe $e$ and extending down into one leg thereof to a point near the bottom. When the water rises in the chamber $f$ on the rise of the level in the river, it will compress air in the bell $h$ and force it through the pipe $i$ into the pipe $e$ and air lock it. As the air pipe $i$ extends into the water in the pipe $e$ it is water sealed against the escape of air except into the pipe $e$ and an effective air binding results. The pipe $e$ will thus be locked against the flow of liquid, and with the construction shown in Fig. 1 will remain locked until the level in the river falls sufficiently to lower the level in the chamber $f$ to relieve the pressure in the bell $h$ and air pipe $i$. Under these conditions the back flow of the water through the pipe $d$ into the drain $a$ will be prevented.

The principles involved may be briefly stated as follows: Given a space filled with air and with water columns upon each side, the water columns will balance each other if of equal height whatever the relative elevations of the points where such columns come in contact with the confined air. This may be taken advantage of to hold a column which occupies an elevated position in check by another column which occupies a lower position. By the apparatus shown it is possible to introduce a body of air into the bent pipe so that it may be confined by bodies of water in the chambers containing the two legs of said pipe and in the chamber containing the bell $h$. The effect of this will be, with the apparatus as shown, as follows: Taking the system shown in the drawing in which the flow is supposed to be through chamber $b$, $c$, in the direction from $b$ to $c$, the water in the river or other reservoir having risen to a certain height air will be introduced into the tube $e$ and will retain its position therein so long as the column acting against the confined air in neither tube is greater than the column in the chamber $f$, that is to say, so long as the three columns, that of which chamber $c$ forms a part, that in chamber $f$, and that in chamber $b$ or in chamber $b$ and ditch or sewer $a$ are equal, the air seal will be confined, but whenever either one of the three becomes less than one or both of the others, the air will escape in the direction of the shortest column. The column of water in $f$ will always be equal to the column against the leg of the tube in chamber $c$, that column being the elevation from the lower end of the bell $h$ to the level of the water in the river. If chamber $f$ be open at the top the level in it will be the level in the river. If chamber $f$ be closed air tight the air compression will be that which is due to the head in the river. Air in bell $h$ will be compressed by a hydraulic column of this height, that is, of the height to the level in the river, and it will balance an equal column in chamber *b*. As the former column increases, the latter column may increase, that is, as the level in the river increases the air may displace more air from the bent tube until it fills the same. Therefore flow may be prevented until the column in the river above the lower end of bell *h* exceeds the column in chamber *b* above the lower end of the bent tube *e* therein, which should never occur under possible conditions for which the apparatus is designed. At the time the air binding is broken, the flow would be from ditch *a* to the river in case water is standing in said ditch. For the purposes stated the relative positions of the parts should be as follows: Assuming that it is desired to prevent back flow at any time prior to the time when the level of the river reaches the top of the dike (any higher elevation would result in overflow in any case), then a point on the dike should be found which is below the top in a vertical line as far as the level of water in the ditch *a* which it is desired to maintain without back flow. In the horizontal line of this point should be placed the top of the bent tube *e* and the bottom of the bell *h*. The down leg of the tube *e* should then be made as long as the distance vertically from the point last mentioned at the top of the dike. In some cases, however, as where a flow of water from the main supply passes through the pipe *e* into a storage tank or reservoir connected with the chamber *b*, or into a system of irrigating drains or ditches, it is desirable that provision should be made for opening the pipe *e* after a given interval of time, to reëstablish the flow, irrespective of the fall of the level of the water in the stream or source of supply. For this purpose devices are employed, for unsealing the pipe *e*, as shown in Fig. 2.

*j* is a chamber adjacent to the chamber *f* with which it communicates through a siphon pipe *k*, the thoroughfare through which may be controlled by a suitable valve *k'*. Within this chamber *j* is an inverted bell *m* communicating through an air pipe *n* with a water sealed trap *o* connected with the upper part of the pipe *e*. Under normal conditions the trap *o* is sealed by water so that no air can escape from the pipe *e*.

When the water has risen to a sufficient height in the tank *f* and the pipe *e* has been sealed in the manner described, the water flowing through the pipe *k* will rise in the chamber *j* until it compresses air in the bell *m*. The air thus forced through the pipe *n* will displace a column of water from the trap *o* and induce a flow of air from the pipe *e* thus unsealing it and allowing the water to flow through it.

By adjusting the valve *k'* in the pipe *k* the flow of water into the chamber *j* may be regulated, and consequently the interval of time which will elapse before the pipe *e* is unsealed may be controlled.

Assuming the apparatus to be used in some connection in which the normal flow is from *c* to *b*, then, with the apparatus as shown, the air binding will begin to be established when the level in the river or supply reservoir has reached a point at which it would flow into the receiving apparatus or ditch *a*, that point being at a level with the top of bent tube *e*. For this operation, also the lower part of bell *h* should be substantially in the same horizontal plane with the top of bent tube *e*, when the level of water in the river or supply reservoir would air bind the receiving chamber *b*, *c*, immediately after it had reached the point where it would, without the intervening mechanism, flow and the flow would be prevented by such air binding until it had reached a level as much higher than that point as the length of the legs of tube *e*, or until the air binding were released by the operation of the apparatus shown in chamber *j*. The flow would, in the latter case, then start and continue until the level of water in the supply reservoir had fallen to the level of the lower end of bell *h* and the top of tube *e*, after which the operation would be repeated.

My improvements are adapted to control the flow of water or liquid in either direction,—either from *c* to *b* or from *b* to *c;* and, while I have shown them applied to the control of the flow between a stream or main source and a ditch, they may be obviously applied to a great variety of uses in practice.

What I claim as new and desire to secure by Letters Patent, is as follows:

1. In apparatus for controlling the flow of liquids, the combination of two chambers separated from one another, a pipe forming a communication between said chambers, a controlling chamber having a communication with a body of liquid, and means in said controlling chamber controlled by the level of the liquid therein to force air into said pipe to air bind it and prevent flow of liquid in either direction upon a rise in the level of the body of liquid with which said controlling chamber communicates.

2. In apparatus for controlling the flow of liquids, the combination of two chambers separated from one another, a pipe forming a communication between said chambers, a controlling chamber having a communication with a body of liquid, means in said controlling chamber controlled by the level of the liquid therein to force air into said pipe to air bind it and prevent flow of liquid in either direction upon a rise in the level of the body of liquid with which said controlling chamber communicates, a relief chamber having communication with the controlling chamber, and means in said relief chamber controlled by the level of the liquid therein to break the air seal in the pipe and free the passage therethrough.

3. In apparatus for controlling the flow of liquids, the combination of two chambers separated from one another, a pipe forming a communication between said chambers, a controlling chamber having a communication with a body of liquid, means in said controlling chamber controlled by the level of the liquid therein to force air into said pipe to air bind it and prevent flow of liquid in either direction upon a rise in the level of the body of liquid with which said controlling chamber communicates, a relief chamber having communication with the controlling chamber, means in said relief chamber controlled by the level of the liquid therein to break the air seal in the pipe and free the passage therethrough, and means to regulate the flow of liquid from said controlling chamber into said relief chamber.

4. In apparatus for controlling the flow of liquids, the combination of two chambers separated from one another, a pipe forming a communication between said chambers, a controlling chamber having a communication with a body of liquid, an inverted bell in said controlling chamber, and an air pipe to force air into said pipe and air bind it when the liquid in the controlling chamber reaches a sufficient level to compress the air in said bell.

5. In apparatus for controlling the flow of liquids, the combination of two chambers separated from one another, a pipe forming a communication between said chambers, a controlling chamber having a communication with a body of liquid, means in said controlling chamber controlled by the level of the liquid to force air into said pipe to air bind it and prevent flow of liquid in either direction upon a rise in the level of the body of liquid with which said controlling chamber communicates, a relief chamber having communication with the controlling chamber, a water-sealed air trap communicating with the pipe, an inverted air bell in the relief chamber and an air pipe leading from the bell to the water-sealed air trap, to break the seal therein and relieve the air seal in the pipe, when the liquid in the relief chamber reaches a sufficient level to compress the air in the bell therein.

6. In apparatus for controlling the flow of liquids, the combination of the chambers $b$ and $c$ divided by a partition wall, the pipe $e$ forming a communication between said chambers, the controlling chamber $f$ having a communication $g$ with a body of liquid, an inverted bell $h$ in said chamber, an air pipe $i$ leading from said bell and extending into the pipe $c$, the relief chamber $j$ having a communication $k$ with the chamber $f$, the water sealed air trap $o$ communicating with the pipe $e$, the inverted bell $m$ in the relief chamber, and the air pipe $n$ leading from the bell $m$ to the trap $o$, substantially as and for the purposes described.

7. In apparatus for controlling the flow of liquids, the combination of a pipe through which the liquid passes, means controlled by the level of an independent body of liquid to force air into said pipe to air bind it and prevent flow of liquid in either direction, and means also controlled by the level of a body of liquid independent of the liquid which passes through said pipe to break the air seal in said pipe and free the passage.

In testimony of which invention, I hereunto set my hand.

ALBERT PRIESTMAN.

Witnesses:
ERNEST HOWARD HUNTER,
R. M. KELLY.